Patented Apr. 4, 1944

2,345,690

UNITED STATES PATENT OFFICE 2,345,690

PROCESS FOR THE MANUFACTURE OF PHOSPHORIC ESTERS OF PHENOLS

Ulrich V. Solmssen, Clifton, N. J., assignor to Hoffmann-La Roche, Inc., Nutley, N. J., a corporation of New Jersey No Drawing. Application March 17, 1941, Serial No. 383,843

8 Claims. (Cl. 260—461)

This invention has for its object the preparation of pure phosphoric acid esters of mono-hydroxy and poly-hydroxy derivatives of the benzene and naphthalene series and their salts corresponding to the structure:

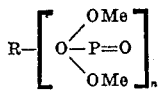

where R is an arylene or aryl residue of the type of phenylene, naphthylene, phenyl and naphthyl which may be substituted by one or more alkyl, such as methyl, ethyl; aryl, such as phenyl, tolyl; aralkyl, such as benzyl, phenyl-ethyl; acyl, such as acetyl, butyryl; alkoxy, such as methoxy, ethoxy, propoxy; aralkoxy, such as benzoxy; aryloxy, such as phenoxy, diphenyloxy; or halogen groups, $n$ is one or two and Me is a hydrogen or other monovalent substituent or monovalent fraction of a polyvalent substitute, such as Na, K, NH$_4$, substituted ammonias, ½Ca, ½Mg, ⅓Al.

Such esters are, for example, those of phenol, o-hydroxy-diphenyl, chlorophenol, benzylphenol, hydroxy-benzophenones, hydroquinone, mono-, di- or trimethylhydroquinone; resorcinol, catechol and their alkyl derivatives, as for example, hexyl resorcinol; naphthols, dihydroxynaphthalenes and alkyldihydroxynaphthalenes, as for example 2-methyl-naphthohydroquinone. The mono-O-alkyl or mono-O-aralkyl or mono-O-acyl substituted poly-phenols such as hydroquinone mono methyl ether, hydroquinone monobenzyl ether, methylnaphthohydroquinone monobenzyl ether and hydroquinone monoacetate may be employed.

Phosphoric esters of the above type may be obtained by halogenating the compounds with a chlorinating agent containing phosphorus capable of combining with a hydroxyl group and have usually been prepared by reacting phosphorus oxychloride with the phenol and descomposing the resulting phenolic phosphoryl chloride with water or an aqueous solution or suspension of a base before or after the removal of accompanying products (such as pyridine hydrochloride when pyridine has been used as an agent to bind the hydrochloric acid formed in the phosphorylation). Such solutions or suspensions are, for example: alkalies or alkaline earth hydroxides, carbonates and alcoholates; ammonia, and amines. When the products so formed are water soluble the isolation is made difficult by the presence of the free hydrochloric acid or chlorides formed in the reaction. The means of removing these have usually been very unsatisfactory. In the case of the free acid, hydrochloric acid may be removed by means of evaporation, but this involves the prolonged subjection of the phosphoric ester to acid conditions which usually results in far-going decomposition of the ester. In the case where inorganic chlorides are present tedious and difficult recrystallizations are often necessary. The isolation of insoluble salts, such as the barium salt, and regeneration therefrom of a soluble salt is also a laborious process.

I have now found that these difficulties may be overcome by transferring the free phosphoric ester formed by the reaction between the phenolic phosphoryl chloride and water into a substantially immiscible solvent of the class of higher alcohols with four to twelve carbon atoms, as for example butyl alcohols, amyl alcohols, octyl alcohols, dodecyl alcohols, benzyl alcohol, cyclohexanols, phenylethyl alcohol, and the like. Those alcohols with 4 carbon atoms are the most efficient, the alcohols with more carbon atoms having a utility in the case of polycyclic phenols. Such alcoholic extracts can be washed or distilled free of hydrochloric acid, after which further distillation of the alcohol in a vacuum leaves behind the free phosphoric ester in substantially pure condition. This material can then be transformed in the usual manner into its salts by adding the corresponding amount of a base such as alkali metal or alkali earth hydroxides, carbonates, alcoholates, ammonia, amines, and so on, in aqueous, alcoholic, or other suitable solution.

Prolonged contact of free phenol phosphoric esters with acidic solutions such as occur when the free phosphoric chloride is reacted with aqueous solutions causes some slight hydrolysis of the phosphoric ester no matter how rapidly the material is worked. In order to avoid obtaining salts of the free phenol so formed in the final product, these free phenols are extracted from the strong aqueous solutions of the salts of the phosphoric esters formed in the neutralization process by a solvent which is immiscible with such a strong aqueous solution of a sodium salt. Such solvents may include those which are normally miscible with water but immiscible with the strong salt solution such as acetone, alcohol, dioxan, or such as are immiscible with water such as benzol, toluol, carbon tetrachloride, ether, and ethyl acetate.

In this manner the salts of 2,5,6-trimethyl-1,4-hydroquinone diphosphoric acid ester salts, hydroquinone diphosphoric acid ester salts, 2-methyl-1,4-naphthohydroquinone acid ester salts, hydroquinone mono ether phosphoric ester salts, such as, for example, disodium salt of the phosphoric ester of hydroquinone mono benzyl ether, the calcium salt of hydroquinone mono methyl ether phosphoric ester, phenol phosphoric acid ester salts, as for example the mono sodium salt of phenol phosphoric ester, and so on may be prepared.

The following examples illustrate the invention without limiting it thereto:

Example 1

2000 gm. 2-methyl-1,4-naphthohydroquinone diphosphoryl chloride are dissolved in 2 liters ether and decomposed with 2 liters distilled water. The mixture is transferred to a separatory funnel and the aqueous layer separated from the ether layer, the latter being discarded. The aqueous layer is extracted with a further 2 liters of ether and again separated and discarded. The aqueous solution of the 2-methyl-1,4-naphthohydroquinone diphosphoric acid is extracted with successive portions of isobutyl carbinol in 500 cc. quantities until the aqueous layer becomes almost colorless, after which this latter is discarded. The isobutyl carbinol solution is then concentrated to remove water and hydrochloric acid, and the crystalline residue neutralized with sodium hydroxide solution. The resulting solution of the sodium salt of 2-methyl-1,4-naphthohydroquinone diphoshoric ester is extracted with two successive portions of 1 liter acetone each and the latter discarded. Methanol and acetone are then added, filtered, and the product brought to crystallization by heating. Crystals of the sodium salt of 2-methyl-1,4-naphthohydroquinone diphosphoric acid ester are sucked off. The substance contains much moisture of crystallization and is dried in vacuum until it contains 21–22% moisture of crystallization as determined by drying at 145° C. at 2 mm. vacuum.

Example 2

1890 gm. trimethyl hydroquinone diphosphoryl chloride are dissolved in 2 liters ether and decomposed with 2 liters distilled water. The aqueous layer is separated, extracted with further small quantities of ether, again separated, and then extracted with successive portions of 500 cc. each benzyl alcohol until the benzyl alcoholic solution is colorless. The benzyl alcoholic solution is dried with shaking over sodium sulfate, filtered, and evaporated in vacuum to remove the benzyl alcohol. The resultant product is substantially pure trimethyl hydroquinone diphosphoric acid ester which can be transformed in the usual manner into salts, as for example, the di-ethylenediamine salt by neutralizing the alcoholic solution of the ester with 590 gm. ethylene diamine, centrifuging the precipitated salt, washing it with ether, then stirring it with acetone and filtering from the latter.

Example 3

1700 gm. hydroquinone diphosphoryl chloride are dissolved in 2 liters ether and decomposed with 2 liters distilled water. Proceeding in the manner of Example 1, the aqueous layer is extracted with cyclohexyl alcohol. Upon removal of the cyclohexyl alcohol the residue comprises substantially pure hydroquinone diphosphoric acid esters which may be reacted in the usual manner to form salts, as, for example, the tetradiethanolamine salt, by taking up absolute alcohol, neutralizing with approximately 2080 gm. diethanolamine, centrifuging the precipitate, washing it with ether, stirring it with acetone and filtering from the latter and drying in vacuum.

Example 4

1300 gm. hydroquinone mono methyl ether phosphoryl chloride are dissolved in 2 liters ether and decomposed with 2 liters distilled water. The aqueous layer is extracted with octyl alcohol until no further material is removed from the aqueous layer. This can be performed in a suitable vacuum extraction apparatus of the Kossel and Steudel type. The octyl alcoholic solution is dried and evaporated down in vacuum to yield hydroquinone mono methyl ether phosphoric acid ester. This can be converted in the usual manner into its salts, as, for example, the sodium salt by taking up in 5 liters alcohol and adding a sodium ethylate solution prepared from 212 gm. sodium and 3000 cc. absolute alcohol. The precipitated salt is sucked off, washed with acetone, and dried in vacuum.

Example 5

1210 gm. phenol phosphoryl chloride are dissolved in 2 liters ether and decomposed with 2 liters distilled water. The aqueous layer is extracted in vacuum extraction apparatus with normal amyl alcohol until no further extraction occurs, when the amyl alcohol solution is removed, and vacuum distilled to remove the solvent when the residue comprises substantially pure phenol phosphoric esters. This material is converted into its salts in the normal manner, as for example, the dipotassium salt, by dissolving the phenol phosphoric ester in alcohol, neutralizing with a solution of 820 gm. potassium hydroxide in alcohol, centrifuging the precipitated salt, washing it with ether and acetone and drying in vacuum.

I claim:

1. In the process for the manufacture of water-soluble phosphoric acid esters of mono and polyhydroxy aryl compounds of the benzene and naphthalene series, the steps comprising reacting the corresponding phenolic phosphoryl chloride with water and extracting the free phosphoric ester with a solvent selected from the class of substantially water immiscible alcohols having 4–12 carbon atoms, and recovering therefrom the phosphoric acid ester.

2. In the process for the manufacture of water-soluble phosphoric acid esters of mono and polyhydroxy derivatives of the benzene and naphthalene series, the steps comprising reacting the corresponding phenolic phosphoryl chloride with water, extracting the free phosphoric ester with isobutyl carbinol, and recovering therefrom the phosphoric ester.

3. In the process for the manufacture of water-soluble phosphoric acid esters of mono and polyhydroxy derivatives of the benzene and naphthalene series, the steps comprising reacting the corresponding phenolic phosphoryl chloride with water, extracting the free phosphoric ester with cyclohexyl alcohol, and recovering therefrom the phosphoric ester.

4. In the process for the manufacture of water-soluble phosphoric acid esters of mono and polyhydroxy derivatives of the benzene and naphthalene series, the steps comprising reacting the corresponding phenolic phosphoryl chloride with water, extracting the free phosphoric ester with hexanol, and recovering therefrom the phosphoric ester.

5. In the process for the manufacture of 2-methyl-1,4-naphthohydroquinone diphosphoric ester the steps comprising reacting 2-methyl-1,4- naphthohydroquinone phosphoryl chloride with water and extracting the free phosphoric ester with a solvent selected from the class of substantially water immiscible alcohols containing 4–12 carbon atoms and recovering therefrom the phosphoric acid ester.

6. In the process for the manufacture of 2-methyl-1,4-naphthohydroquinone diphosphoric ester the steps comprising reacting 2-methyl-1,4-naphthohydroquinone phosphoryl chloride with water, extracting the phosphoric acid ester with isobutyl carbinol, and distilling off the isobutyl carbinol.

7. In the process for the manufacture of water-soluble phosphoric acid esters of mono and poly-hydroxy aryl compounds of the benzene and naphthalene series, the steps comprising reacting the corresponding phenolic phosphoryl chloride with water, extracting the phosphoric acid ester with a solvent selected from the class of substantially water immiscible alcohols having 4–8 carbon atoms, recovering therefrom the phosphoric acid esters, reacting the latter with a base, and extracting a solution of the salt formed with a solvent immiscible with the salt solution selected from the class of solvents of the said mono and poly-hydroxy aryl compounds of the benzene and naphthalene series.

8. In the process for the manufacture of the tetra sodium salt of 2-methyl-1,4-naphthohydroquinone diphosphoric acid ester, the steps comprising reacting 2-methyl-1,4-naphthohydroquinone phosphoryl chloride with water, extracting the phosphoric acid ester with isobutyl carbinol, distilling off the isobutyl carbinol, neutralizing the free phosphoric ester with sodium hydroxide, extracting the salt solution with acetone and crystallizing the sodium 2-methyl-1,4-naphthohydroquinone diphosphate formed.

ULRICH V. SOLMSSEN.